Oct. 28, 1969    J. E. McWILLIAMS    3,474,916
APPARATUS FOR LOADING BAGGED MAIL FROM A
LOADING DOCK INTO A HIGHWAY VEHICLE
Filed April 5, 1968    2 Sheets-Sheet 1
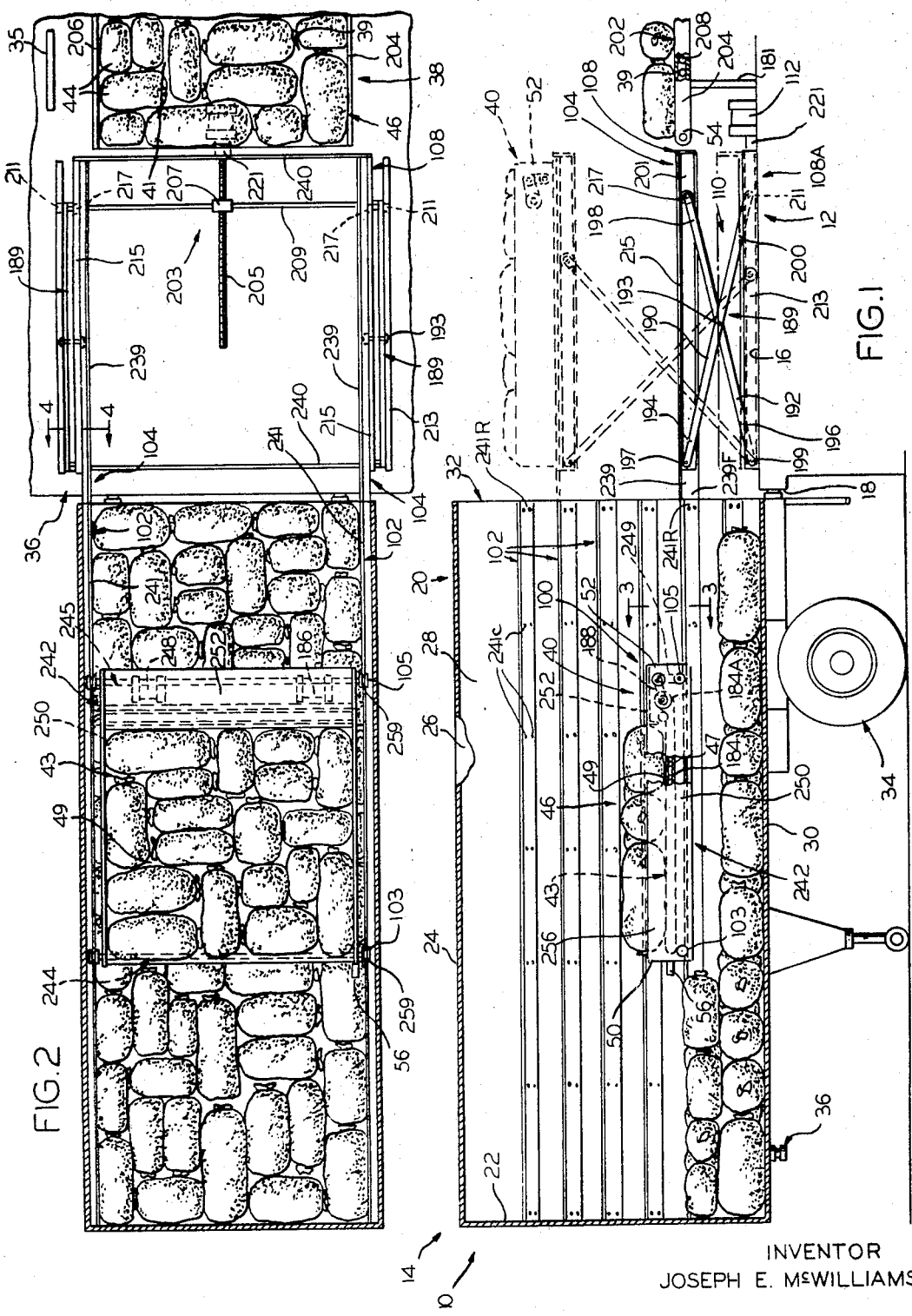
INVENTOR
JOSEPH E. McWILLIAMS
BY
Mann, Brown McWilliams
ATTORNEYS

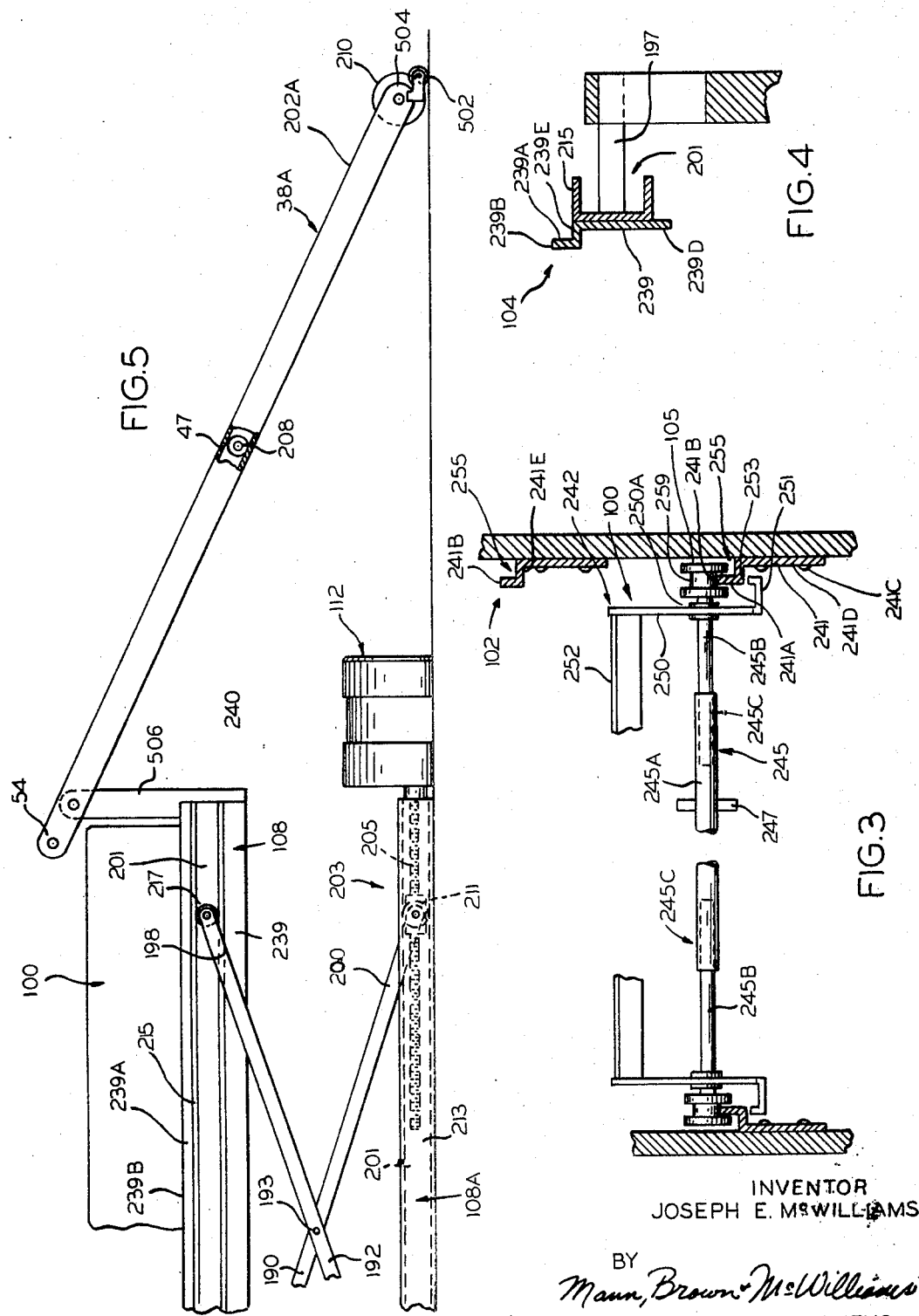

United States Patent Office 3,474,916
Patented Oct. 28, 1969

3,474,916
APPARATUS FOR LOADING BAGGED MAIL FROM A LOADING DOCK INTO A HIGHWAY VEHICLE
Joseph E. McWilliams, 1345 Canterbury Lane, Glenview, Ill. 60025
Filed Apr. 5, 1968, Ser. No. 719,195
Int. Cl. B65g 57/00, 67/04
U.S. Cl. 214—6                                                  9 Claims

ABSTRACT OF THE DISCLOSURE

The invention relates to the loading of mail bags from a loading dock into an end loading highway vehicle, such as a truck or a trailer, to fully load the vehicle with mail bags in which the bags are compactly loaded into place in either horizontally disposed layers, or an individual stack forming tiers, without those performing the bag loading operation having to enter the vehicle. In practicing the invention, the loading dock at the post office or the like is provided with a conveyor on which out-going bags are placed and oriented in closely spaced form to provide a mail bag load unit. Operating between the conveyor and the highway vehicle is a self-propelled carriage carrying a load support that receives the unit load without disturbing the orientation of the bags forming it, brings the load into the vehicle loading area for discharge of the load unit, and effects placement of the load unit as part of the stacked bags in the vehicle, again without disturbing the orientation of the bags. The carriage then returns to the conveyor for another load. In the form shown, the carriage is shifted horizontally between a load receiving position adjacent the loading dock conveyor and one of several trackways formed in the vehicle at consecutive elevations expedient to deposit the bag load units in layers that extended horizontally of the vehicle.

The carriage movements are controlled so that the individual load units are formed into either horizontally disposed layers of bags, or into vertical stacks of mail bags, that are disposed to position the bags of adjacent stacks in closely spaced relation, with the vehicle being thus filled with bags throughout its load receiving area so as to make maximum use of the available loading space within the vehicle to maximize the pay load. The operation of the carriage is mechanized so that workers do not have to go into the vehicle, and palleting of the bags in groups is avoided while still achieving uniform loading in tier form.

Several specific arrangements for practicing the invention are disclosed wherein the bags as loaded extend either longitudinally or transversely of the vehicle.

---

This application is closely related to my applications Ser. No. 627,217, filed Mar. 30, 1967, and Serial No. 694,151, filed Dec. 28, 1967.

This invention relates to a method and apparatus for loading bagged mail from a loading dock into a highway vehicle, and more particularly, to methods of and means for facilitating the handling of bagged mail in individual load groups for purposes of loading same into vehicles that are to transport it.

Conventional methods of loading mail bags into highway vehicles and trailers of the end loading type are not only time consuming and inefficient in nature, but also require much manual effort on the part of the workers involved. The bags are conventionally loaded so as to form vertical stacks in which the bags of each stack extend longitudinally of the vehicle and the stacks fill all available space vertically and lengthwise of the vehicle. The bags, which when loaded are from 12–14 inches wide and 36–40 inches long, are usually loaded up to about 92 inches above the floor of the truck in a space that is about eight feet wide, with the length depending on the length of the truck.

Heretofore the loading procedures have been largely manual in nature, with the workers involved dragging the individual bags into the vehicle from a pile of the bags on the adjacent loading dock, and then individually positioning and lifting the bag as is necessary to complete the formation of the respective bag stacks. At best, hand carts are sometimes employed to reduce some of the manual effort involved, but the handling required of each individual bag is still much the same; in both cases, much repetition of bag orienting movements is required for each bag, which is wasteful of effort and inefficient in terms of the time and cost of getting the job done. The result is that valuable equipment is unduly tied up to accommodate these slow loading procedures, and labor is in short supply as workers are becoming increasingly reluctant to take on jobs involving such hard work.

Nevertheless, the Post Office Department and others concerned with the transport of loaded mail bags, load something on the order of 50,000 trucks a day in the U.S.A. in this manner at a cost on the order of $18 a truck, which gives an indication of the magnitude of the problem.

My Patent 3,164,271, granted Jan. 5, 1965, discloses a basic system for handling bagged mail which involves the sorting and loading of incoming bags into tier load units that are grouped by destination and stored until arrival of a suitable load transport vehicle whereupon the tier load units are unloaded in single or multiple tier form in the vehicle.

A principal objective achieved by the methods and apparatus disclosed in said patent is that the mail bags are oriented early in the cycle of their handling operations and this initial orientation is maintained throughout all of the subsequent handling operations.

The present application is directed to improvements over several of the various arrangements shown in my said applications and modifications thereof.

A principal objection of the present invention is to provide methods and apparatus for further facilitating the loading of end opening vehicles without requiring that the operator enter the transport vehicle or that the mail bags be palleted in groups to reduce individual handling.

Another principal object of this invention is to provide a method of loading bagged mail in transport vehicles in closely spaced relationship to the end that the available air spaced within the vehicle will be loaded to the maximum and all manual motions ordinarily required to handle the bags within the vehicle are performed by mechanical means arranged to carry, elevate as necessary and deposit the bags in the compact relationship necessary to maximize the pay load by substantially filling the available cubic loading space of the vehicle.

Another principal object of the invention is to provide methods and apparatus for loading of end opening vehicles such as motor trucks and trailers which permits a single operator to efficiently load the entire transport vehicle without stepping inside it.

Still other objects of the invention are to provide apparatus for loading bagged mail in transport vehicles that is adapted for full push button type actuation and control, to provide methods and apparatus for handling bagged mail that permits substantially automatic handling of the mail in tiered or other types of load unit groups, and to provide mail bag handling apparatus that is economical of manufacture, convenient in use, and adapted for all conventional mail bag loading dock areas and vehicles or their equivalents.

Other objects, uses, and advantages will be obvious or become apparent from a consideration of the following detailed description and the application drawings.

In the drawings:

FIGURE 1 is a diagrammatic side elevational view of a semi-trailer in the process of being loaded in accordance with my present invention, with the semi-trailer shown in section, and the mail bag load unit carrying carriage being shown in its load receiving position in the lower dashed line position while its full line position shows one of the load discharging positions thereof;

FIGURE 2 is a plan view of the apparatus shown in FIGURE 1;

FIGURE 3 is a fragmental cross-sectional view taken substantially along line 3—3 of FIGURE 1;

FIGURE 4 is a view similar to that of FIGURE 3 but taken along line 4—4 of FIGURE 2; and FIGURE 5 is a fragmental side elevational view of the loading dock supported elevating mechanism for the carriage, illustrating a modified form of the invention.

However, it is to be distinctly understood that the specific embodiments of the invention illustrated are supplied primarily to comply with the requirements of the Patent Code, and that the invention may have other embodiments.

GENERAL DESCRIPTION

Reference numeral 10 of FIGURE 1 generally indicates one embodiment of the present invention that incorporates the basic approach of my said application Ser. No. 694,217 for loading mail bags from a loading dock 12 into an end loading vehicle 14, which has been illustrated as being in the form of the familiar semi-trailer, although the invention is readily applicable to any end loading vehicle.

It is assumed that the mail bag handling installation involved includes the loading dock 12 (of a post office or the like) that is conventionally provided with a level load support surface 16 and the usual shoulder or end 18 against which the vehicle 14 is backed up for purposes of being loaded.

It is also assumed that the vehicle 14 be in the form of the usual body 20 defined by forward end wall 22, top wall 24, side walls 26 and 28, floor 30, and end opening 32 that is customarily closed by suitable doors or the like (not shown). The body 20, being of the semi-trailer type, rides on the usual rear wheels 34 and is provided with the usual kingpin 36 for connection to the fifth wheel of a conventional tractor truck (not shown).

In accordance with this invention, there is associated with the loading dock 12 at the position 36 where the vehicle body 14 is to be stationed for loading purposes a mail bag receiving conveyor 38 and a mail bag tier conveying carriage or carrier 40, which receives the mail bags accumulated on conveyor 38, transports them into the vehicle 14 and discharges them in such a manner as to either form horizontally disposed mail bag layers 113, or vertically disposed stacks, as described in my said application Ser. No. 694,151.

Under ordinary circumstances, the loading dock 12 is located at a post office or the like where loaded mail bags are processed for shipment to their destinations and as indicated in FIGURE 2, the conveyor 38 and the carriage 40 are longitudinally aligned with the vehicle 14 (in the loading position of the vehicle) and have a width transversely thereof to accommodate enough mail bags laid side by side in a row to form one complete tier of a stack 42 shown in my said application Ser. No. 694,151, such that when the tier is placed within the vehicle 14, it will extend substantially from one side wall 26 to the other side wall 28 as indicated in FIGURE 2 or said application Ser. No. 694,151. Conveyor 38 is in the form of conveyor belt 39 defining a substantially horizontal loading supporting surface 41 on which the bags 44 are placed, which surface is at an easy reach height above surface 16, such as two to three feet high. Carriage 40 carries a load support in the form of conveyor 43, which conveyor 43 is in the form of a conveyor belt 47 defining load support surface 49.

In practicing my invention, the mail bags are brought in any suitable manner to the area of the conveyor 38 and they may be piled at random adjacent the conveyor 38 for ready access by one or more workers stationed adjacent the conveyor 38 for purposes of controlling the operation of same and carriage 40. In accordance with this invention, the controls for conveyor 38 and carriage 40 including its conveyor 43 and the other apparatus involved are arranged so that these pieces of apparatus are operated without anyone having to go into the vehicle 14. For this purpose, the controls may be of the push button type applied to suitable control panel 35 and may be of any suitable electric and/or electronic type that will serve the purpose.

In the specific forms of FIGURES 1–5, the carriage 40 is in the form of a trolley or carrier 100 that operates in trackways 102 and 104 that are mounted on the vehicle and loading dock 12, respectively, on either side of the path of movement of the carriage 40 and are adapted to be aligned and placed in substantial abutting relation when the vehicle 14 is backed into its load receiving relation with respect to loading dock 12 and the loaded carrier 100 is to enter the vehicle. The trolley or carrier 100 includes rollers 103 and 105 on either side thereof that ride in the respective trackways so that the carriage 40 can move between the dashed and full line positions of FIGURES 1. The rollers 105 are driven in any suitable manner. Carriage 40 is moved vertically between its load receiving position of FIGURE 1 and the elevational level that it is to discharge a particular load from by incorporating trackways 104 in a vertically movable frame 108 that is adjusted vertically by lift mechanism 110 powered by suitable electric motor 112.

To practice my invention, after the vehicle 14 is positioned as shown in FIGURES 1 and 2 for loading (assuming it is empty), and the bags to be shipped are disposed, for instance in a pile or piles adjacent the conveyor 38, the worker or workers in the area of conveyor 38 pick up and position enough of the individual bags 44 to form on belt 39 in accordance with the specific random bag positioning illustrated one load unit 46 made up of random size bags 44 in random but closely spaced positions relative to each other and containing enough bags to fully load carrier 100.

When a load unit 46 has been applied to conveyor 38 in the manner indicated (which units are termed a "partial transport vehicle load depth unit" in the appended claims), the carriage 40 is positioned as shown in the lowermost dashed line position of FIGURE 1, and the conveyor 38 is actuated to deposit all the bags 44 forming the load unit 46 on the carriage conveyor 43. The carriage conveyor 43 is simultaneously actuated to move the first bags received out of the way to a position adjacent its forward end 50, both conveyors being operated until the load unit 46 is fully transferred to the carrier 100. It is to be noted that the rear end 52 of the carrier 100 is disposed in load receiving relation with respect to the forward end 54 of the conveyor 38 at this point in the operation of the system.

The lift mechanism 110 is then actuated to move frame 108 from the lowermost dashed line position of FIGURE 1 to that position in which trackways 104 are horizontally aligned with the lowermost trackways 102, whereupon carrier 100 (being self propelled) is actuated to move into the vehicle 14 on the lowermost trackways 102 and toward the front wall 22 of the vehicle to start the first horizontal layer 113 of mail bags. Assuming that the vehicle 14 is completely empty, the carriage 40 moves forwardly of the vehicle 14 until its forward end 50 engages the wall 22, which actuates a suitable limit switch arrangement such as that indicated at 56 to stop the forward movement of the carriage 40 and actuate conveyor 43 as well as reverse the movement of the carriage 40 in such a manner that as the carriage 40 moves rearwardly of the vehicle 14, the first load unit 46 of bags 44 is conveyed forwardly at a similar speed (for a net speed of zero relative to vehicle 14), and the bags thereof are dropped onto the floor 30 of the vehicle adjacent the end wall 22 in the position indicated.

The carriage 40 is then returned to the lowermost dashed line position of FIGURE 1 to receive the next load unit 46 of mail bags 44, which can be formed on to the conveyor 38 while the carriage 40 is operating in the manner that has just been described. This next load unit is then unloaded in a similar manner but at the next load unit position rearwardly of the first load unit, the limit switch 56 being actuated by engagement with the load unit already in place to start the unloading procedure of carriage 40 that has already been described that deposits the carriage load in the position indicated. The carriage is then reloaded and unloaded in a similar manner to dispose succeeding load units where indicated, until the first layer 113 is completed. The succeeding layers 113 are similarly formed, carriage 40 being elevated as required for any unloading operation to place succeeding layers 113 on top of those already in place.

This process is repeated until the layers 113 have been formed the depth of vehicle 14, after which the vehicle open end 32 is secured in the usual manner and the vehicle 14 driven off to be replaced by a similar vehicle 14 to be loaded.

Alternately, the layers 113 may be formed by filling in the vehicle 14 by consecutively forming vertically disposed stacks of the tiers 46 that are described in my said application Ser. No. 694,151. In doing this, the worker or workers in the area of conveyor 38 positions the bags on conveyor 39 to form a load unit of one or more tiers (of six to eight bags in a tier) in which the bags thereof extend longitudinally of the conveyor 39 and vehicle 14. The tier load is then transferred to carriage 40 and deposited in the same manner as already indicated, although the operator has the choice of unloading the tiers to consecutively form vertical stacks of the bags 40 rearwardly of the vehicle 14, or to consecutively form layers 113 upwardly of the vehicle, the apparatus 110 being appropriately operated to position frame 108 as and when required to dispose the trackways 104 in horizontal alignment with the proper trackways 102.

The handling of the bags in moving them from the conveyor 38 to their respective positions in the vehicle 14 is thus carried out after having made a single orientation of the bag as to the position it is to take in a particular load unit and without having to drop the bag over the 24 inch limitation provided for by Post Office regulations, frame 108 and carriage 40 being proportioned vertically, and trackways 102 being disposed vertically, as required to avoid a drop in excess of this limitation.

From the description so far there are several important features to be observed. Note for one thing that the bags 44 are properly oriented in their load units or tiers by their application to the conveyor 38, and that this orientation is maintained throughout the further handling of the bags that moves them into stacked relation in the vehicle 14. Furthermore, the lifting and positioning of the bags 44 onto conveyor 38 is the only manual labor involved, and the worker is concerned with only an easy lifting and positioning action at a convenient working height above surface 16, with such action needing only to be performed once per bag.

It is also to be noted that the loading of the vehicle 14 is done without anyone having to enter the vehicle 14, and palletizing of the individual tiers 14 unnecessary.

SPECIFIC DESCRIPTION

The trackways 104 that support trolley or carrier 100 on dock 12 comprise a pair of Z-shaped rail members 239 joined together by end plates 240 to form frame 108, which may be reinforced in any suitable manner to support the loads involved. The trackways 102 each comprise a Z-shaped rail member 241 secured to the respective side walls 26 and 28 of vehicle 14 in vertically spaced pairs disposed in the vertically spaced relation indicated in FIGURES 1 and 3 that effects convenient formation of the bag layers 113 on operation as described. Members 239 and 241 are arranged so that their upstanding flanges 239A and 241A respectively provide rail head or roller surfaces 239B and 241B, respectively, that support carrier 100 through its rollers 103 and 105. Members 241 are secured in place in any suitable manner, as by employing bolts or rivets 241C applied through their respective lower and outer flange portions 239D and 241D, respectively, and in accordance with this invention, the walls 26 and 28 of vehicle 14 may consist essentially of the members 241 together with such vertical bracing members as may be considered necessary or desirable.

Members 239 and 241 are proportioned so that when vehicle 14 is backed to dispose its rear end against dock end 18, the rear ends 241R of the members 241 will be positioned in substantial abutting relation with the forward ends 239F of members 239 when the frame 108 is elevated to align its members 239 with a selected pair of members 241.

The trolley 100 comprises a suitable frame 242 provided with suitable cross shaft structures 244 and 245 with which the respective rollers 103 and 105 are operably associated, rollers 105 being keyed to the shaft structure 245 that is driven by suitable electric motor 248. Motor 248 operates through a suitable transmission which selectively drives the shaft 245 through a suitable sprocket 247 (see FIGURE 3) and chain drive 249 (see FIGURE 1). Frame 242 comprises side plates 250 joined together by cross plate 252 and that journal rollers 184 that support the belt conveyor 47. Belt conveyor 47 is driven by suitable electric motor 186 that drives the conveyor end pulley 184A adjacent same through suitable pulley belt 188.

The side plates 250 of carrier 100 in the form shown include upwardly extending portions 256 on either side of the frame 242 between which the bags 14 forming the individual load units are disposed. Motors 186 and 248 are supported in any suitable manner under cross plate 252.

The rollers 103 and 105 are grooved as at 259 to receive the upper portions 239A and 241A of the respective trackway forming members 239 and 241, which serves to guide the movements of carrier 100 as it moves longitudinally of trackways 102 and 104. The particular shape of the members 241 provides a space 255 for the rollers 103 and 105 to operate in when within vehicle 14. Since the side walls 26 and 28 of vehicle 14 will tend to vary in spacing because of differences in vehicle makes and warpage tendencies, the shaft structures 244 and 245 are preferably telescoping in nature, and for this purpose shaft structure 245 is shown in FIGURE 3 as comprising a main portion 245A (to which the sprocket 242 is fixed) carrying adjusting portions 245B to which the individual rollers 105 are keyed, with there being a splined connection between the respective shaft portions where indicated at 245C. Shaft structure 244 is the same as shaft structure 245 except that it lacks sprocket 247 and the respective shaft adjusting portions are journalled in suitable bearings 250A mounted in side plates 250 of frame 242. Thus, rollers 103 and 105 adjust laterally of carrier 100 to accommodate width variations between the trackways 102 that carrier 100 may be operating on in a particular vehicle 14.

The carrier 100 adjacent each roller carries a guide arm 251 that extends under the shoulder 253 defined by the respective trackway forming member 239 and 241 at their web portions 239E and 241E, respectively (see FIGURE 3) to keep carrier 100 from being displaced from the trackways.

The trackways 102 and 104 and rollers 103 and 105 may alternately take the form described and illustrated in my copending application Ser. No. 702,007, filed Jan. 31, 1968 (the disclosure of which is incorporated herein by this reference) in which the trackways are defined by channel shaped members that are suitably mounted in place of the members 239 and 241 herein-described, and the carriage rollers ride within the channel shaped members. However, the form illustrated is preferred.

If desired, the members 239 may be each equipped with a suitable latching device (not shown) that automatically locks the respective members 239 to the pair of members 241 frame 108 is aligned with for a particular unloading step, and which automatically unlocks when the carrier 100 returns to frame 108.

The elevating mechanism 110 in the form shown comprises pairs 189 of cross levers 190 and 192 on either side of frame 108 that are pivoted together at 193, which have their ends 194 and 196 respectively pivoted to the platform 45 and a base frame 108A, respectively, as at 197 and 199, and their other ends 198 and 200 operating in suitable ways 201 formed by frames 108 and 108A, respectively, with one of the cross levers being drawn forwardly of the frame 108A by a suitable screw and nut type device 203 or the like to raise the frame 108 from the lowermost load receiving position of FIGURE 1 to any of the positions required to align the member 239 with a desired set of members 241.

Screw and nut device 203 comprises a screw or threaded rod member 205 suitably journalled in frame 108A and threadedly carrying nut member 207 (see FIGURE 2) that is secured to rod 209 which extends between and is pivotally secured to the ends 200 of levers 190. Rod 209 has rollers 211 journalled on its ends that ride in the respective ways 201 that are defined by the channel shaped side members 213 of frame 108A. The ends 198 of levers 192 have journalled thereon rollers 217 that ride in the ways 201 of frame 108 that are in the case of frame 108 defined by channels 215.

The screw member 205 is driven by the suitable electric motor 112 or the like through a suitable gear box 221 to feed nut member 207 longitudinally of screw member 205 to achieve the opening and closing of cross levers 190 and 192 that raises and lowers frame 108.

Conveyor 38 of the embodiment of FIGURES 1 and 2 is in the form of a frame 202 including side members 204 and 206 in which are journalled the rollers 208 that support the belt conveyor 39. Belt conveyor 39 is driven by a suitable electric motor driving the adjacent conveyor end pulley through a pulley belt or the like, as disclosed in my said application Ser. No. 694,151. Frame 202 is mounted on loading dock 12 on suitable supports 181, in the form of FIGURES 1–4, and is so disposed relative to the path of movement of frame 108 that as the bags pass over end 54 of conveyor 38, they are deflected onto conveyor belt 47 by cross plate 252 (which may be shaped to give some guiding action thereto, if so desired). Belt 47 is actuated as carrier 100 is being loaded to move the first bags received by it out of the way of those coming.

In the form of FIGURE 5, conveyor 38A has its frame 202A hinged to frame 108, as at 500, and rides on rollers 502 at its rearward end 504, as frame 108 moves up and down. In this embodiment, frame 108 is hinged between plates 506 that are carried by frame 108. Conveyor 38A is otherwise the same as conveyor 38, it being driven by suitable motor 210 suitably supported on frame 202A. Conveyor 38A thus remains in loading relation to carrier 100 regardless of the position of frame 108 between its uppermost and lowermost operating positions, and consequently, in this form of the invention frame 108 need not be lowered for each loading of carrier 100. Frame 108 can thus be set at the elevation desired for finishing one bag layer 113, and kept at the elevation until such layer 113 is completed, the bags being manually applied to the inclined conveyor 38A to feed them up onto carrier 100 in the manner already described.

As disclosed herein and in my said application Ser. No. 694,151, the bags 14 may be loaded onto the conveyor 38 or 38A to form load units in different patterns of orientation; that is, instead of the bags 14 extending longitudinally of the vehicle, the bags may be disposed to extend transversely of the vehicle or at random but closely spaced positions (as shown) with respect to each other, which relative positions are maintained during further handling of the bags by operating the conveyors 38 or 38A, carriages 40 and its conveyor 43 in the manner already suggested to deposit the bags on the floor of the vehicle. The initial positioning and orientation of the bags in all manner of practicing the invention is the indicated closely spaced relation to obtain maximum utilization of available storage space within the vehicle when fully loaded as herein disclosed.

For all embodiments of the invention, the operations of the conveyors, bag carrying carriage and lift apparatus are operated from a control panel 35, or the like, located outside of the vehicle, through any suitable wiring arrangement, and ordinarily only a single operator will be needed to both load the bags on the dock supported conveyor and operate the machines to deposit the bags in the vehicle 14. The machines can readily be controlled to avoid dropping the bags further than the 24 inch limitation prescribed by the Post Office Department.

It is to be understood that the practice of this invention does not require that the conveyor 38 in all instances be used for loading the bags 44 into load units. Occasionally it may be more convenient for the operator to place the bags directly on carriage 40 when it is resting on frame 108 in the lowermost position of the latter, as when there are just a few bags to be loaded at a particular time in the loading procedure, or the bags are brought to the operator a few at a time. Furthermore, in situations where the dock 12 is too narrow to accommodate both the conveyor 38 and frame 108, the conveyor 38 may be omitted and the bags loaded directly onto the carriage 40 when same is on frame 108 in the lowermost position thereof.

The bag stacking arrangements of this invention will load trucks and trailers in a fraction of the time now required and at less than half the cost, while at the same time greatly reducing the effort required by workers handling the bags. This not only greatly reduces the tie up time for each truck, but also significantly reduces the over-all cost of mail bag handling.

As to all described embodiments and methods herein disclosed, the load units or tiers formed on the loading dock are termed "partial transport vehicle load depth unit" in the appended claims.

The foregoing description and the drawings are given merely to explain and illustrate my invention since those skilled in the art who have my disclosure before them will be able to make modifications and variations therein without departing from the scope of the invention.

I claim:
1. In bulk mail handling apparatus for loading mail bags from a loading dock into the load receiving area of an end loading transport vehicle backed into load receiving position adjacent the dock to dispose its end opening to receive the bags, without workers on the dock handling the bags having to enter the vehicle, and without requiring that pallets remain with the bags after they are loaded into the vehicle, said apparatus comprising:

a conveyor mounted on the loading dock adjacent but spaced from the load receiving position of the vehicle and having a width transversely thereof approximately the width of the vehicle area, said conveyor being positioned to be aligned with the vehicle and its end opening in the load receiving position of the vehicle, said conveyor presenting an upwardly facing load transporting surface at least a portion of which is at an elevation for convenient manual lifting of the bags from the dock onto the conveyor surface, a frame mounted on the loading dock between the load receiving position of the vehicle and said conveyor, said frame including a trackway extending longitudinally of said conveyor, with the vehicle having mounted therein a plurality of vertically spaced trackways adapted to be longitudinally aligned with said frame trackway when the vehicle is disposed in said load receiving position;

a mail bag receiving carriage operable on said trackways, when the vehicle is in said load receiving position and proportioned to enter said vehicle end opening, said carriage having a load support approximating the width of the vehicle area, means for vertically positioning said frame trackway with one of the vehicle trackways in carriage transferable relation therewith when the vehicle is in said load receiving position, means for moving said carriage along said trackways between a mail bag receiving position adjacent said conveyor and predetermined mail bag discharging positions within the vehicle, and means for discharging from said carriage load support bags received thereon from said conveyor, whereby mail bags may be loaded onto said conveyor load support with the bags thereof oriented to be disposed in closely spaced load unit forming relation, and said load unit bags may be mechanically transferred between said conveyor surface and a predetermined position in said vehicle area while maintaining said orientation.

2. The apparatus set forth in claim 1 wherein:
said means for vertically positioning said frame trackway comprises:
cross-lever lifting means interposed between said frame and the loading dock,
and power means for actuating said lifting means,
said lifting means being proportioned and arranged to maintain said frame trackway substantially horizontal at all positions of elevation thereof.

3. The apparatus set forth in claim 2 wherein said carriage load support comprises:
an endless conveyor and means for driving same,
the last mentioned means comprising said means for discharging the bags from said load support.

4. The apparatus set forth in claim 1 wherein:
said trackways each comprise a rail member on either side of said carriage,
and wherein said carriage comprises:
a carrier frame having rollers on either side thereof riding on the respective rails,
said rollers including flange means disposed in guiding relation to the respective rails.

5. The apparatus set forth in claim 4 wherein:
said rollers are adjustable laterally of said carrier frame to accommodate varying trackway spacing.

6. The apparatus set forth in claim 4 wherein said rail members of the vehicle have a Z-shaped cross-sectional configuration defined by laterally and vertically spaced parallel flange portions separated by a web portion,
with the lower and outer flange portion thereof being secured to the vehicle and the inner and upper flange portion serving to support said rollers when said carriage is carried thereby.

7. The apparatus set forth in claim 4 wherein:
said carriage includes guide arms extending under said rail members for cooperating therewith to prevent dislodgement of said carriage from said trackways.

8. The apparatus set forth in claim 1 wherein:
said loading dock conveyor is fixedly mounted thereon,
and said vertically positioning means is proportioned to dispose said carriage, when carried by said frame trackway, at an elevation such that said carriage may be disposed in a mail bag receiving position with respect to said loading dock conveyor.

9. The apparatus set forth in claim 1 wherein:
said loading dock conveyor has the load discharging end thereof hingedly carried by said frame and the other end thereof roller supported on the loading dock.

References Cited

UNITED STATES PATENTS 2,035,359  3/1936  Anjeskey _____ 214—624
3,315,825  4/1967  Scheinert _____ 214—75

GERALD M. FORLENZA, Primary Examiner

ROBERT J. SPAR, Assistant Examiner

U.S. Cl. X.R.

214—41